(12) United States Patent
Son et al.

(10) Patent No.: US 6,606,078 B2
(45) Date of Patent: Aug. 12, 2003

(54) MULTI-VIEW IMAGE DISPLAY SYSTEM

(75) Inventors: Jung Young Son, Seongnam-si (KR); Yong Jin Choi, Seoul (KR); Ji Eun Ban, Seoul (KR); Vladimir Saveliev, Novosibirsk (RU); Eugene F. Pen, Novosibirsk (RU)

(73) Assignee: Korea Institute of Science and Technology, Seoul (KR)

( * ) Notice: Subject to any disclaimer, the term of this patent is extended or adjusted under 35 U.S.C. 154(b) by 28 days.

(21) Appl. No.: 09/842,861

(22) Filed: Apr. 27, 2001

(65) Prior Publication Data

US 2002/0008674 A1 Jan. 24, 2002

(30) Foreign Application Priority Data

Apr. 29, 2000 (KR) .......................................... 2000-23181

(51) Int. Cl.$^7$ ................................................. G09G 5/00
(52) U.S. Cl. .............................. 345/6; 345/102; 348/51; 359/462; 359/475
(58) Field of Search ................................ 345/4, 5, 6, 7, 345/8, 102, 694, 698; 348/51, 54, 59, 42, 52, 53, 55, 56, 57, 58; 349/61, 62, 66; 359/462, 466, 467, 475

(56) References Cited

U.S. PATENT DOCUMENTS

| | | | | | |
|---|---|---|---|---|---|
| 3,668,639 A | * | 6/1972 | Harmuth | ........................ | 345/6 |
| 4,717,949 A | * | 1/1988 | Eichenlaub | ..................... | 345/6 |
| 4,729,017 A | * | 3/1988 | Sayanagi et al. | ............... | 345/6 |
| 4,829,365 A | * | 5/1989 | Eichenlaub | .................... | 348/54 |
| 6,069,650 A | * | 5/2000 | Battersby | ...................... | 348/59 |

FOREIGN PATENT DOCUMENTS

| | | |
|---|---|---|
| JP | 1-156791 | 6/1989 |
| JP | 5-273675 | 10/1993 |
| JP | 10-282871 | 10/1998 |

* cited by examiner

*Primary Examiner*—Xiao Wu
(74) *Attorney, Agent, or Firm*—Oblon, Spivak, McClelland, Maier & Neustadt, P.C.

(57) ABSTRACT

A multi-view image display system provides a plurality of multi-view three-dimensional (3-D) images, using the mask type of image arrangement plate where the images grouped by corresponding pixels are arranged in a same order as that of the pixels. Each pixel cell is provided with an image display region which is divided into a plurality of subcells arranged depending on arrangement structure of the viewing zones, and each of the subcells transmits or reflects the lights from point light sources using its whole area, thereby allowing the transmitted or reflected lights to be collected in each of the viewing zones to form each of the view images.

37 Claims, 15 Drawing Sheets

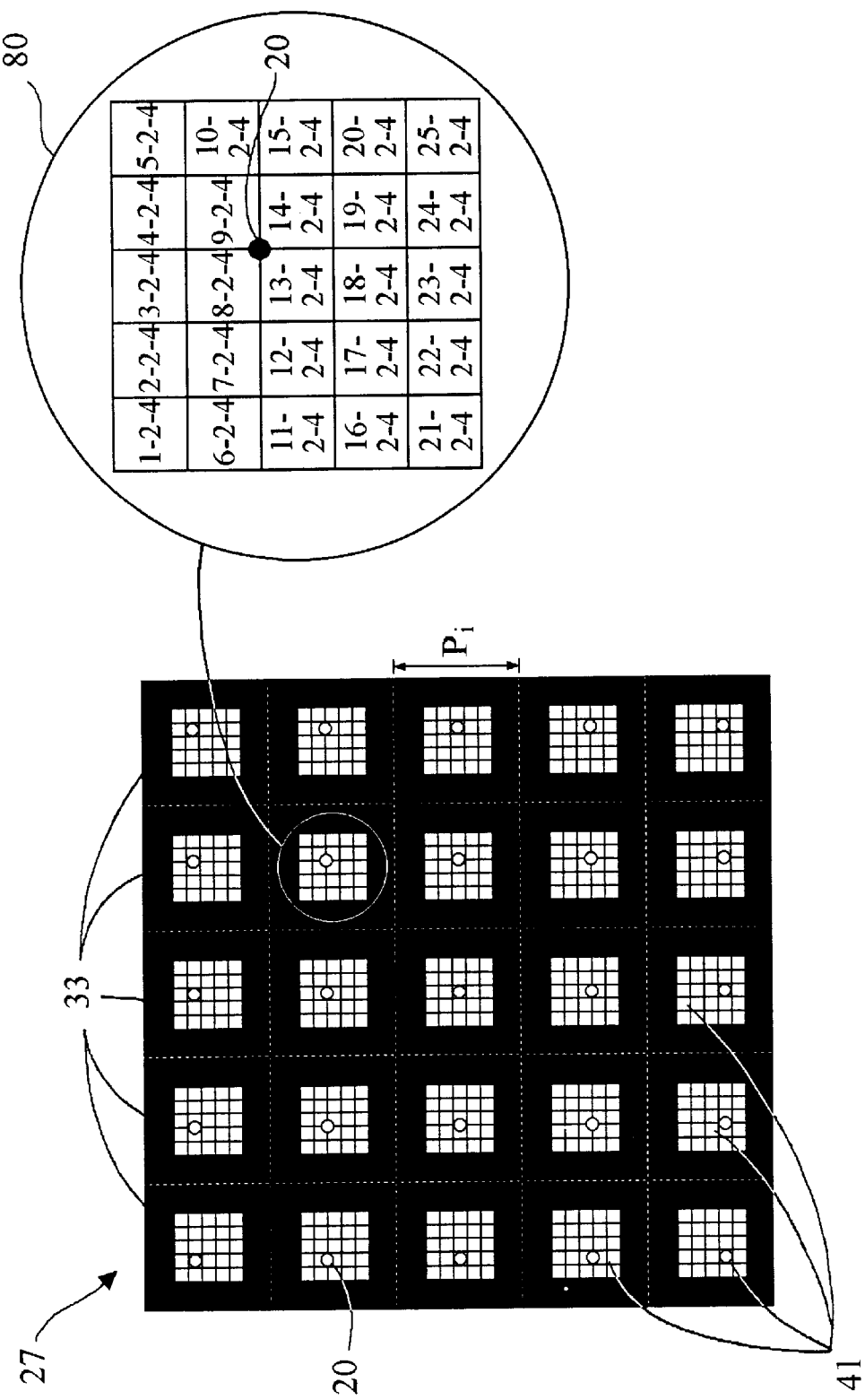

FIG. 3B
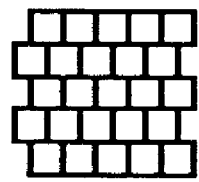
ZIG-ZAG
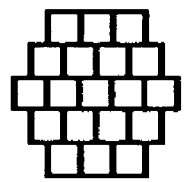
POLYHEDRON
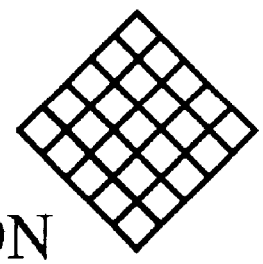
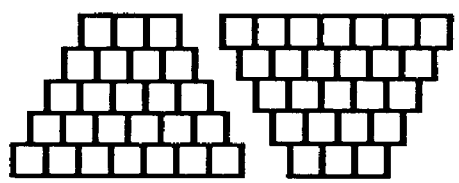
TRAPEZOID
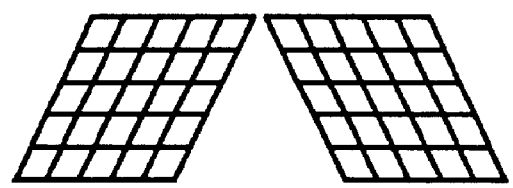
RHOMBUS
POSSIBLE EFFECTIVE IMAGE
DISPLAY REGION SHAPE

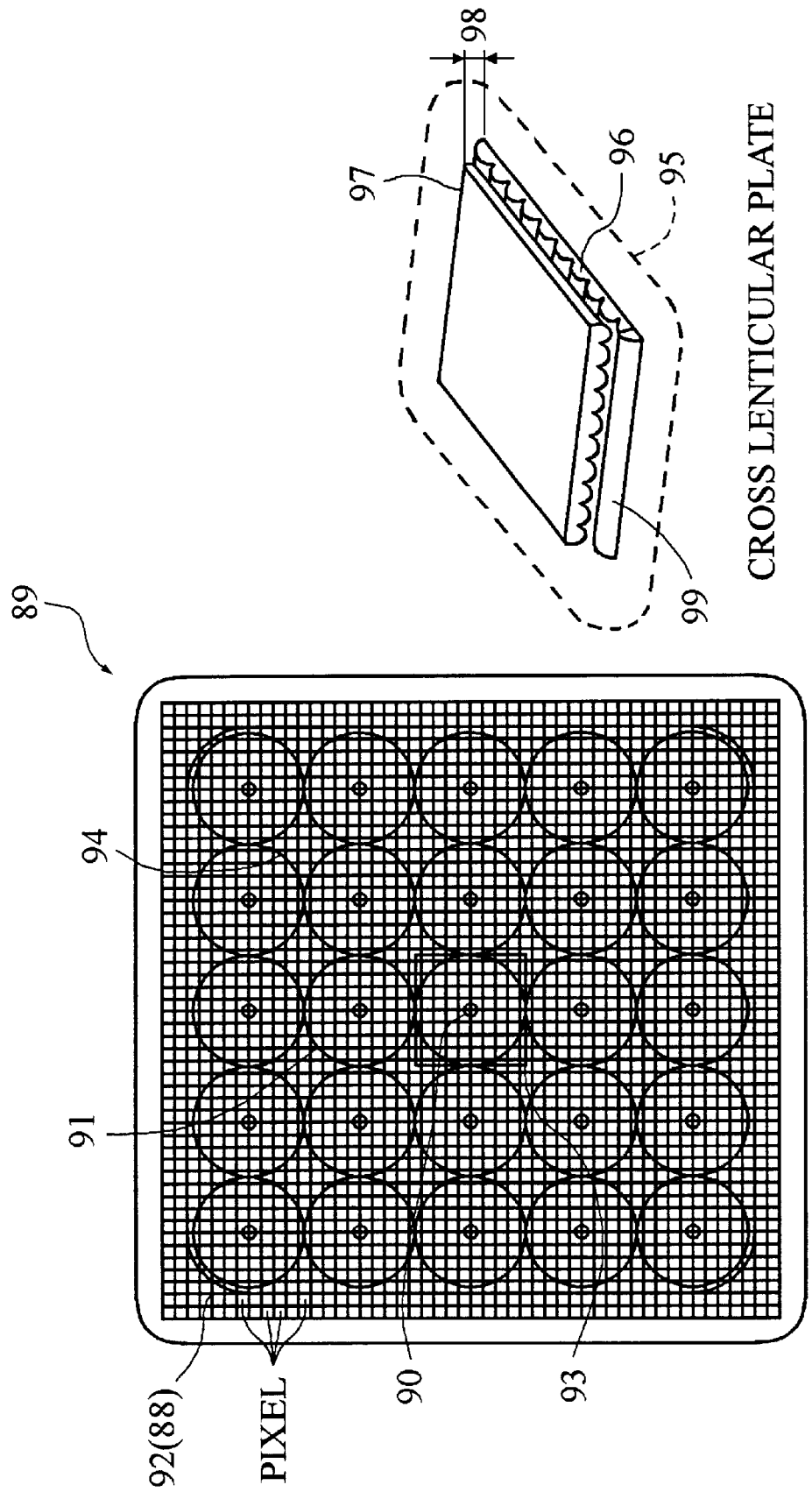

HORIZONTAL PARALLAX ONLY CASE

VERTICAL PARALLAX ONLY CASE

SQUARE SHAPE PINHOLE

CIRCULAR SHAPE PINHOLE

MULTI-VIEW IMAGE DISPLAY SYSTEM

BACKGROUND OF THE INVENTION

1. Field of the Invention

This invention relates to a multi-view image display system for providing a plurality of view images having different view points to a viewer. More specifically, this invention relates to an improved multi-view image display system which is capable of providing a plurality of multi-view three-dimensional (3-D) images using a mask type of image display plate.

2. Description of the Related Art

Various methods for displaying 3-D images have been developed. For example, there are 1) a method for displaying the 3-D images on a scattered media using a laser beam being resonated in the air, 2) a method for displaying the 3-D images which are obtained from a plurality of pick-up devices arranged horizontally, in a predetermined order in consideration of space and/or time, 3) a method for displaying a stereoscopic image of an object by a depth-based sampling, 4) a method for providing a viewer with special eyeglasses using a parallax between a left eye and a right eye, and 5) a method using a human psychological effect by a very large image.

Among the above methods, the second displaying method is widely used in the art since it can be compatible with existing image systems implemented on a flat surface. This method is called an optical plate method because it employs the optical plate for forming a viewing zone. According to this method, flat images having different view points are displayed on a display device sequentially, depending on space and/or time; and then are projected on the optical plate or are viewed through the optical plate. Thus, multi-view images may be displayed in a space- or time-multiplexing manner on the display device; and the space- or time-multiplexed multi-view images may form an independent viewing zone by the optical plate, whereby the viewer can see a stereoscopic or 3-D image through the viewing zone.

When the viewer's vision moves, an user will fix his (or her) eyes to another viewing zone by an image viewed in another view point; and therefore, the user can view the 3-D image. However, this method employs only a horizontal parallax except for a vertical parallax, wherein it adds to a stereoscopic feel a motion parallax corresponding to a parallax between both eyes. Further, this method fails to consider accommodation or convergence which is used for the both eyes to view the 3-D image in the actual world. For such reasons, the viewer's eyes become easily tired, which results in a drawback that the user can not see the 3-D image for a long time.

In order to solve this problem, there have been proposed many methods which consider both of the horizontal parallax and the vertical parallax at a time. These methods allow the viewer to see the 3-D image with various poses such as an ordinary 2-D image monitor, thereby rendering fatigue of the eyes lower. Among the methods, holography is most widely known in the art. However, the holography has a shortcoming that it is difficult to implement electrically because it contains an enormous amount of data. Another frequently used method is an integral photography (IP). In the IP, an image of an object is first picked-up through a micro lens array. And then, the picked-up image is displayed on a flat surface display device such as a liquid crystal display (LCD) through a display plate. Thereafter, the viewer can see the displayed image through another micro lens array having similar characteristics as the micro lens array. To be more specific, in the IP, since each of lens included in the micro lens array may pick up the whole image of the object to be viewed at a given position of the array, the one micro lens array serves as a plurality of cameras arranged in 2-D (See "F. Okano et al., Applied Optics, V36, pp. 1598–1603, 1997"). Therefore, the IP can represent both of the horizontal parallax and the vertical parallax at a time, to thereby display a stereoscopic image. However, since the IP must record the whole image of the object through the micro lens, it is necessary to develop a display device capable of displaying the whole image of the object through the area corresponding to a diameter of the micro lens to provide a desired resolution. As a result, it is difficult to make a micro lens array having a relatively high resolution and a non-continuous image by the space between the adjacent micro lenses may incur a problem of noisy black dots in the image.

Alternatively, a pixel division method is disclosed in U.S. Pat. No. 4,829,365 issued to Eichenlaub. FIGS. 1A and 1B show diagrams of a 3-D image display system employing the pixel division method. This 3-D image display system comprises an image display mask 18 and a point light source array 19. The image display mask 18 has 8×8 pixel cells, wherein each of the 8×8 pixel cells has a plurality of subcells 23, as illustrated in FIG. 1B.

For the convenience of explanation, as shown in FIG. 1B, it is assumed that there are 16 images 1–16 each of which is comprised of 8×8 pixels picked up by each of cameras 1–16 arranged in the form of 4×4 matrix. In this case, each of the 8×8 pixel cells consists of a plurality of pixels each of which is positioned in the same location in the images 1–16. For example, a pixel cell 21 disposed in row 1 and column 5 in the image display mask 18 consists of 16 pixels 1-1-5, 2-1-5, . . . , 16-1-5 disposed in same row and column as those of the pixel cell 21 in the image display mask 18, i.e., row 1 and column 5 in each of the images 1–16. Each of the pixels 1-1-5, 2-1-5, . . . , 16-1-5 is arranged in the form of 4×4 matrix based on the position of a corresponding camera. These 4×4 pixels, 1-1-5, 2-1-5, . . . , 16-1-5, correspond to the subcells explained above, respectively.

The mask 18 is illuminated by the point light source array 19 which is disposed over the back plane of the mask 18 and is provided with 8×8 small point light sources disposed in the same arrangement as the 8×8 pixel cells. Each of point light sources 20 in the point light source array 19 is arranged to locate at the center of each of the 8×8 pixel cells. Apertures 22 are formed in each of the subcells 23 in the pixel cell to pass light. The position of the aperture in one subcell is determined such that light passing through it is collected at same position with lights from apertures at corresponding subcells in other pixel cells, whereby pixels corresponding to any one view point can be collected to form an image. However, since the size of each aperture 22 must be sufficiently smaller than that of each subcell to provide a resolution corresponding to the number of the pixels for each view point image, an optical efficiency is low. Also, since each of the point light sources 20 is fixed at the center of each of 8×8 pixel cells, it is impossible to separate the multi-view images in the desired position by adjusting the position of each of the apertures within the subcells.

SUMMARY OF THE INVENTION

It is, therefore, a primary object of the present invention to provide a multi-view image display system which provides simultaneously a horizontal parallax and a vertical parallax as well as provides a high optical efficiency and a reliable separation of multi-view images.

In accordance with an aspect of the present invention, there is provided A multi-view image display system for providing a plurality of view images having different view points to a viewer, said plurality of view images forming individual viewing zones, respectively, and the viewing zones being arranged two-dimensionally to form a reference viewing zone, the system comprising: a point light source array having M×N point light sources; and an image display mask disposed between the reference viewing zone and the point light source array, wherein the image display mask has M×N pixel cells, each of said pixel cells being illuminated by each of said point light sources, wherein said each pixel cell has an image display region which is divided into a plurality of subcells arranged depending on an arrangement structure of the viewing zones, and each of said subcells transmits or reflects lights from the point light sources using a whole area of said each subcell, thereby allowing the transmitted or reflected lights to be collected in each of said viewing zones to form each of said view images.

BRIEF DESCRIPTION OF THE DRAWINGS

The above and other objects and features of the present invention will become apparent from the following description of preferred embodiments given in conjunction with the accompanying, in which:

FIG. 3A shows positions of the effective image display region and the point light source in the image display system shown in FIG. 2;

FIG. 3B shows possible shapes of the effective image display region;

FIG. 9 illustrates the relative dimension and position of the effective image display region of the image display mask and the micro lens array shown in FIG. 8;

DETAILED DESCRIPTION OF THE INVENTION

Figure 2:
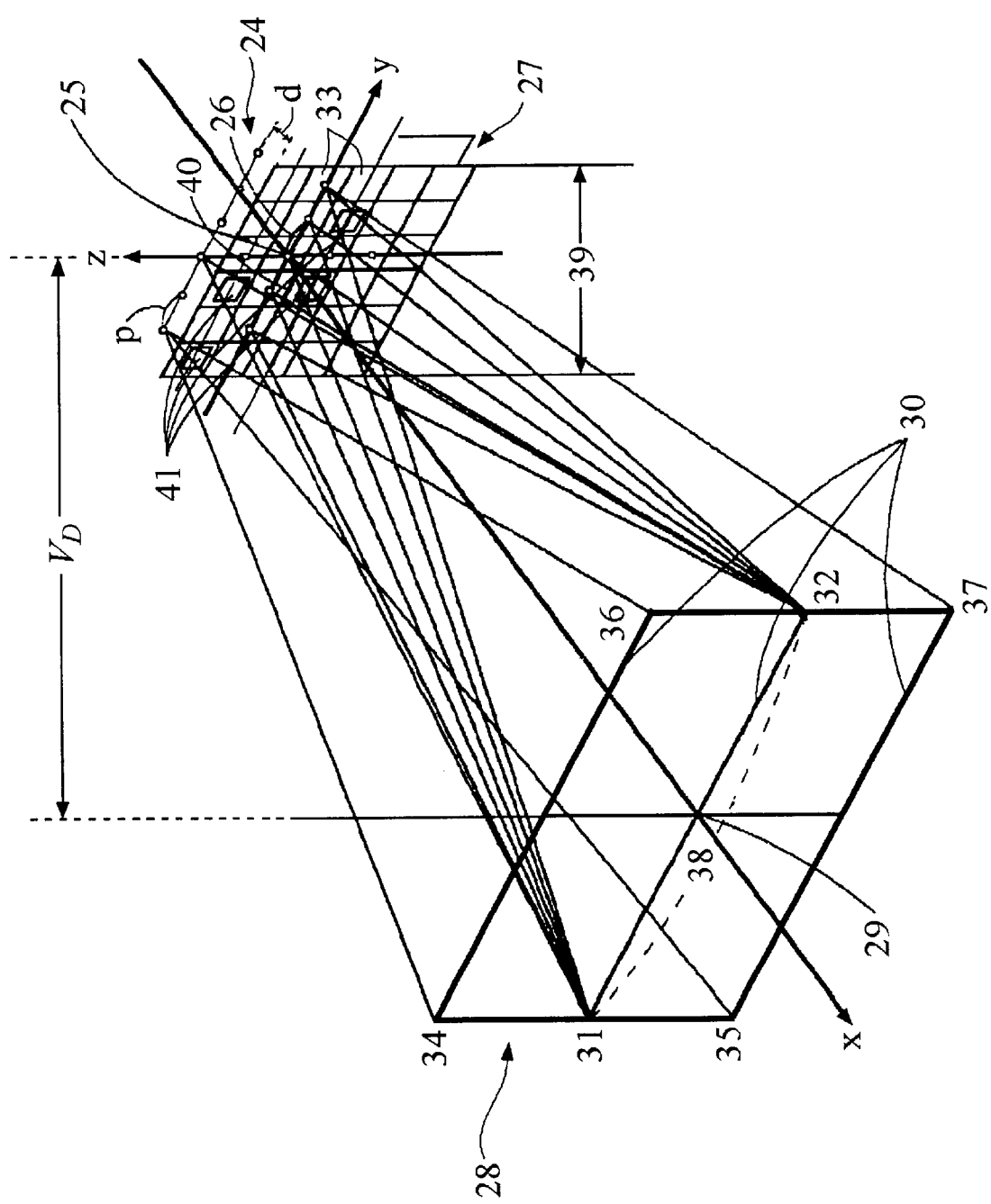
FIG. 2 illustrates the diagram of a multi-view image display system according to the present invention.

FIG. 2 illustrates a diagram of a multi-view image display system in accordance with an embodiment of the present invention.

As shown in FIG. 2, the inventive multi-view image display system comprises an image display mask 27 and a point light source array 24. The point light source array 24 lies in the y-z plane in a three-dimensional Cartesian coordinate and has a plurality of point light sources, which are arranged in the form of 5×5 matrix and spaced with a constant internal p (26) from a point light source 25 positioned at the origin of the three-dimensional Cartesian coordinate.

The image display mask 27 is positioned at a distance d in front of and parallel to the point light source array 24. Lights from the point light sources pass through the image display mask 27 and form 3-D stereoscopic images in a reference viewing zone 28 which is disposed at a distance $V_D$ from the point light source array 24. The reference viewing zone 28 consists of a plurality of sub viewing zones where an image from a different view point are shown, respectively. If each eye of the viewer is positioned in the reference viewing zone 28, the viewer can see images of different view points separately, and therefore the viewer can feel stereoscopy. In the reference viewing zone 28, each eye of the viewer can see all the point light sources in the point light array simultaneously. The reference viewing zone 28 may define an effective image display region 41 and have a shape same as a outer frame of the camera array which may pick-up a multi-view image. For the convenience of explanation, it is assumed that the shape of the reference viewing zone 28 is a rectangle. The reference viewing zone 28 is disposed at a distance $V_D$ from the point light source array 24 in the direction of the X-axis and parallel to a y-z plane, and the center of the reference viewing zone 28 is on the X-axis. Also, it is assumed that the width of the reference viewing zone 28 is greater than the horizontal width 39 of the image display mask 27. The image display mask 27 is provided with 5×5 pixel cells 33 of an identical size. All the points where each of the pixel cell 33 of the image display mask 27 intersects lines connecting each of the point light sources and the corners 34–37 of the reference viewing zone 28, are within the 5×5 pixel cells 33.

The width of each of the pixel cells 33 of the image display mask 27 is defined by two points of a triangle connecting a left end 31 or a right end 32 of the reference viewing zone 28 and two adjacent point light sources. More specifically, the width of each of the pixel cells 33 of the image display mask 27 is identical to the distance between the two intersections where the triangle and the image display mask 27 meet. The point light source array and the image display mask 27 are disposed such that a center point light source is positioned in the middle of a center pixel cell 40 of the image display mask 27. In this case, an effective image display regions 41, which are formed by the points where the lights from each of the point light source may meet each of the pixel cell 33 of the image display mask 27, are the same shape as the reference viewing zone 28, i.e. rectangle, and are the same size each other. If the reference viewing zone 28 is square, the effective image display region 41 of all the pixel cells may have an identical size of square. The shape of the effective image display region 41 depends on that of the viewing zone. Therefore, if the shape of the viewing zone is changed to one of the shapes of a rhombus, a diamond, a trapezoid or a circle, the effective image display region 41 will take on a corresponding shape. Accordingly, the layout of the pixel cell may be random.

The effective image display region 41 formed in each of the pixel cells 33 is defined by the ends of the left, right, top and bottom of the reference viewing zone 28, and is positioned at the center of each of the pixel cells 33. Since each of the pixel cells 33 is displaced toward the center from the corresponding light source and an amount of the displacement becomes greater as a distance between the reference viewing zone 28 and the point light source array 24 becomes shorter, each of the point light sources can be not positioned at the center of each of the pixel cells 33 except the center pixel cell 40. For the case when the distance from the left end 31 to the right end 32 is equal to or small than horizontal width 39, the same analysis as above is effective.

In the case that a liquid crystal display screen is used as the image display mask 27, it is possible to display moving pictures by a computer. In addition, this image display mask 27 may be displayed on a light-emitting display screen. The image display mask may be generated by a computer supporting layout for the pixel cell and the subcell based on the plurality of view images, and a pitch of the pixel cell of the image display mask may not be equal to an integer number multiplied by a pitch of the pixel of devices used in displaying or printing the image display mask.

Figure 1A:
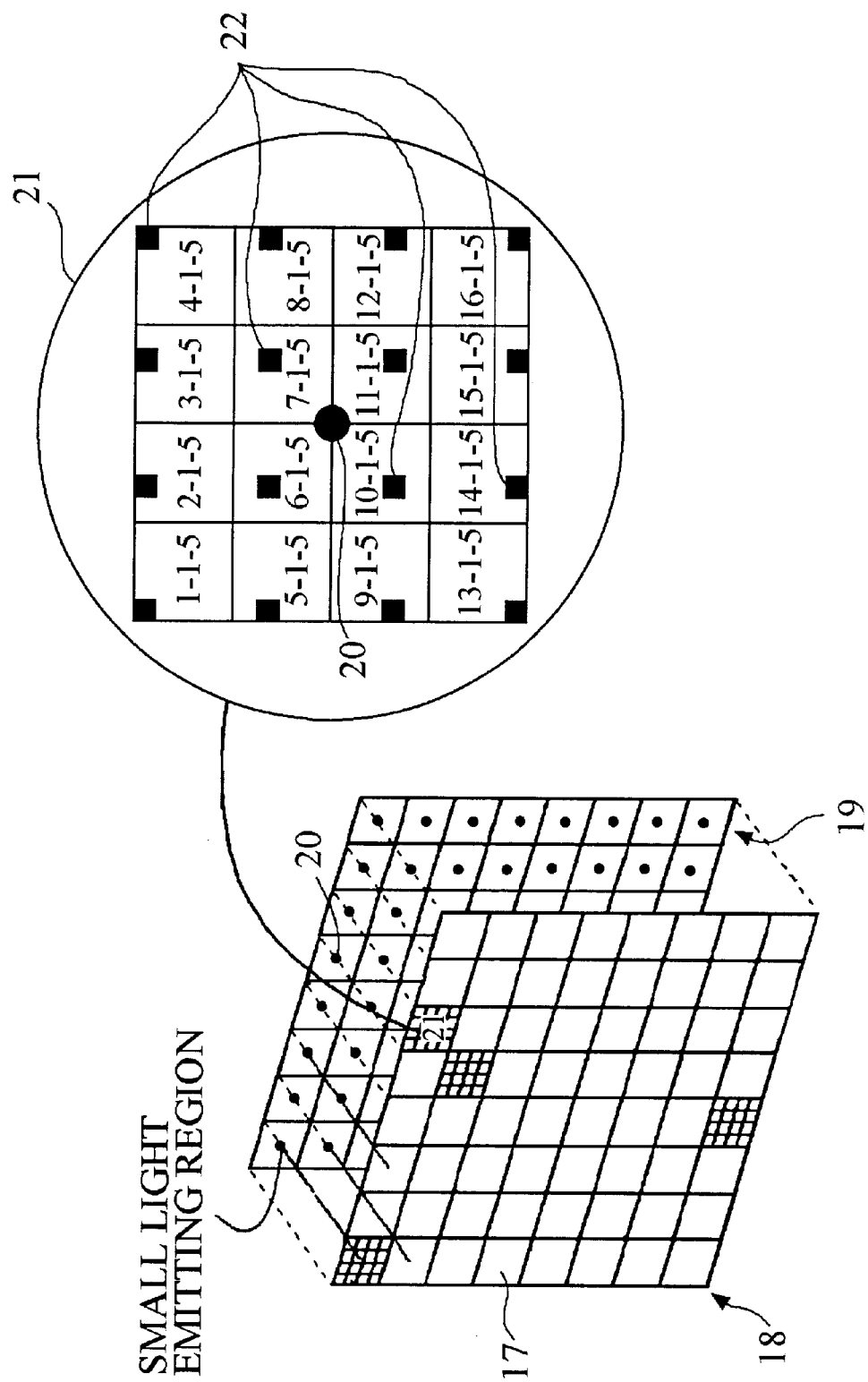
FIGS. 1A and 1B show a diagrams for explaining a 3-D image display system employing a conventional pixel division method.
Figure 1B:
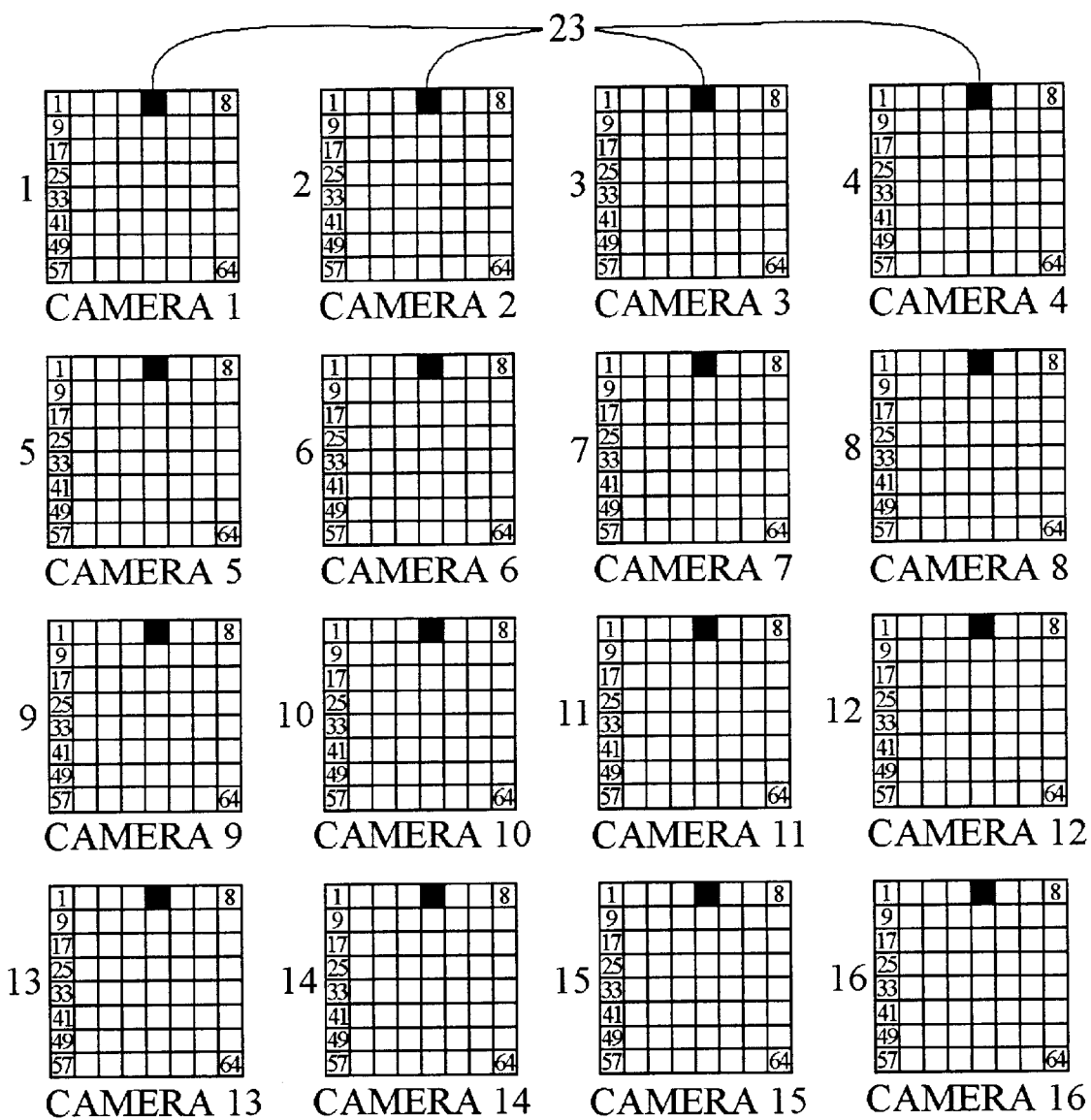

FIG. 3A shows positions of the effective image display region 41 and the point light source 20 in the pixel cell 33 of the image display mask 27. The pixel cell 33 is shown as a black square, the effective image display region 41 is shown as a white grid, and the point light source 20 is shown as a small circle. There is no gap between the adjacent pixel cells 33. As the point light source 20 is positioned nearer to the center of the image display mask 27, the point light source 20 is located nearer to the center of the effective image display region 41. As shown in FIG. 3A, the pixels corresponding to the view points in each of the pixel cells 33 are located within the effective image display region 41 of the pixel cell 33 rather than over the whole area of the pixel cell 3 like as in FIG. 1. Also, in FIG. 1, a part of the subcell is opened such that the lights from subcells corresponding to the predetermined view point in each of the pixel cells by the point light source are collected so as to reproduce each of the images for each of the view points. However, in FIG. 3A, each of the pixels is formed by dividing the effective image display region 41 into the subcells, whose number is the same as the pixels, with the same configuration as that of the multi-view image. Thus, each of the pixels may transmit or reflect the lights from the point light source using its unique color and gray level. In case that the effective image display region 41 is in the shape of square, the pixels 80 having an identical size are arranged to correspond to the subcells 1-2-4, 2-2-4, ..., 25-2-4, as in the pixel cell 21 of FIG. 1. However, there is no aperture in each of the subcells 1-2-4, 2-2-4, ..., 25-2-4, and the whole area of each the subcell work for the aperture. Since, each of the subcells may form each of viewing zones for each of view points in the reference viewing zone 28 and the brightness of each of the viewing zones for each of the view points does not depend on the area of the viewing zone, it is not necessary for each subcell corresponding to the pixel in the effective image display region 41 to have an identical size. But, pixels, which exist in the identical view point in the different effective image display regions, must have an identical shape and size.

FIG. 3B shows possible shapes of the effective image display region 41. As shown in FIG. 3B, in the case that the effective image display region 41 is a square or a rectangle rotated by 45 degree or 135 degree, a rhombus, a diamond, a trapezoid, various polyhedrons, a circle, etc., the pixels have the same shape as the effective image display region 41.

The region except for the effective image display region 41 in the image display mask is recognized only by one eye. Therefore, if a real image is displayed through the image display mask in the state the region remains in a blank space or black, the quality of the image may become worse since a white or black pattern of a check shape exits in the recognized image. In order to avoid this problem, it is preferable to continuously display the images of different view points in the region without maintaining the white and black therein.

Figure 4:
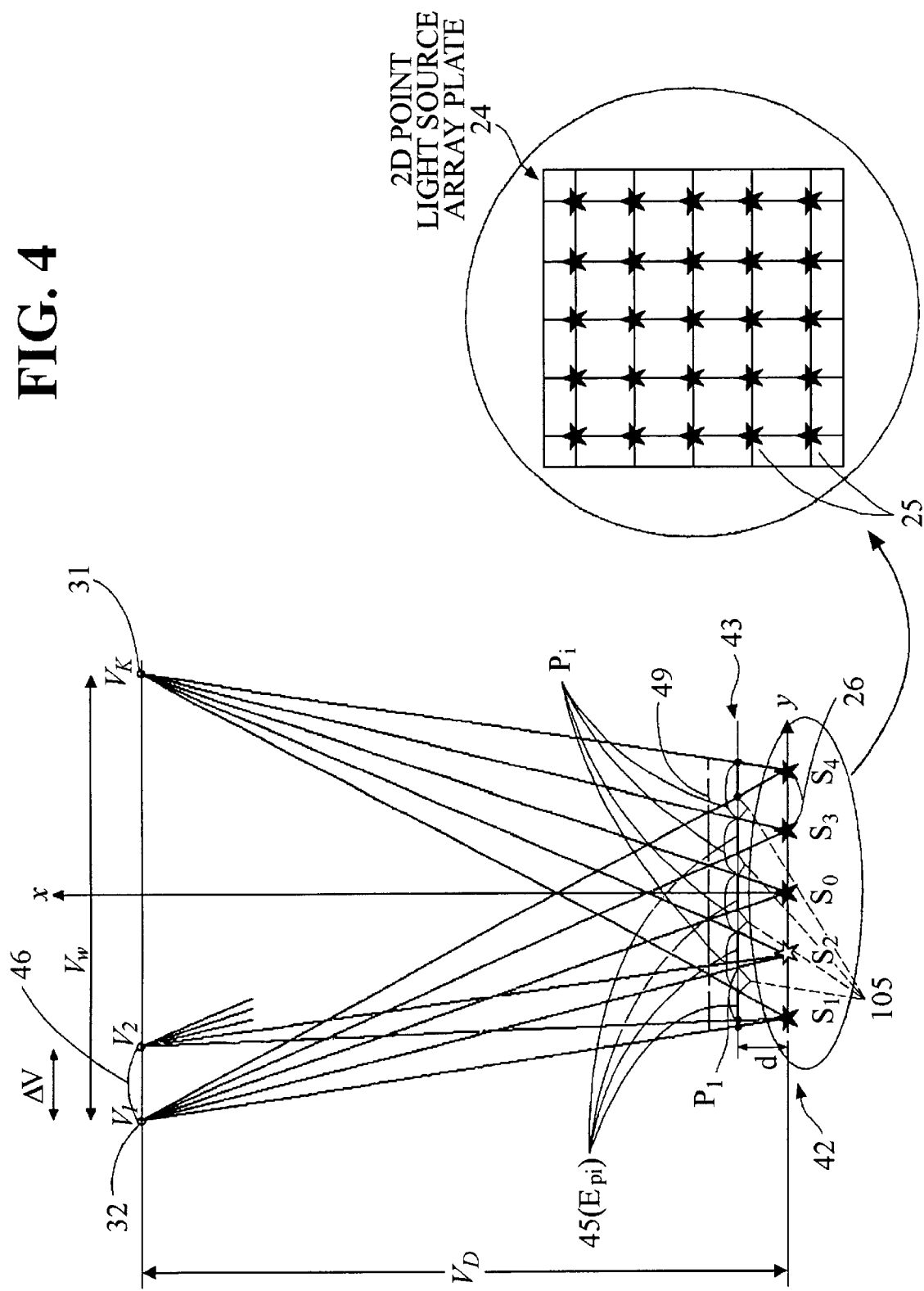
FIG. 4 shows an expanded view of the system shown in FIG. 2 with respect to the x-y plane.

FIG. 4 shows an expanded view of the multi-view image display system shown in FIG. 2 with respect to the x-y plane. For the purpose of illustration, it is assumed that k images, each of which has a different view point, are displayed in a horizontal direction. In this case, there are 5 point light sources $S_0$–$S_4$ in a row 42 of the point light sources of a point light source array 24 which lies on the x-y plane. The point light source $S_0$ corresponds to the origin of the coordinate system. And, the point light sources $S_1$ and $S_2$ are positioned at the left of the point light source $S_0$, while the point light sources $S_3$ and $S_4$ are positioned at the right of the point light source $S_0$. The point light sources $S_0$–$S_4$ are spaced apart from each other with the identical interval p.

Sub viewing zones $V_1$–$V_K$ is disposed at a distance $V_D$ from the point light source $S_0$. Each of the sub viewing zones $V_1$–$V_K$ is formed so as to provide K different view point images which are separated from each other in the horizontal direction. Among the zones V1–VK, V1 is the leftmost sub viewing zone, whereas VK is the most right sub viewing zone. In this case, $V_1$ and $V_K$ may function as the viewing zones for reference view points of the left direction and the right direction which may determine a overall geometrical structure.

A row 43 of the images on the x-y plane of the image display mask 27 is disposed at a distance d from the point light source row 42. An ith horizontal width $p_i$ (i=0, 1, 2, 3, ...) of the pixel cell 33 may be calculated from information relating to triangles, $V_1S_1S_2$, $V_1S_0S_2$, $V_1S_0S_3$ and $V_1S_3S_4$, each of which consists of $V_1$ and two adjacent point light sources. More specifically, the ith width $p_i$ corresponds to distances between intersections where the triangles and the image row 43 are crossed. All the widths are identical to each other and each of the widths may be given as follows:

$$p_i = p\left(1 - \frac{d}{V_D}\right) \quad \text{Eq. (1)}$$

wherein $P_i$ indicates an width of the image row 43 which is visible in the sub viewing zone $V_1$.

From Eq. (1), it will be understood that $p_i$<p. Similarly, distances between intersections where each of triangles, $V_KS_1S_2$, $V_KS_0S_2$, $V_KS_0S_3$ and $V_KS_3S_4$, and the image row 43 are crossed, can be represented as Eq. (1).

In the meantime, a same point light source has to be seen in two sub viewing zones at a same time in order to allow the user to recognize a stereoscopic image. The regions, where the identical point light source can be seen over all the sub viewing zones between $V_1$ and $V_K$, corresponds to the effective image display region 41 in FIG. 3A. An ith horizontal width $E_{pi}$ of the effective image display region 41 is determined on the basis of triangles $V_1V_KS_1$, $V_1V_KS_2$, $V_1V_KS_0$, $V_1V_KS_3$ and $V_1V_KS_4$ each of which consists of $V_1$, $V_K$ and any one of the point light sources. The ith width $E_{pi}$ is defined as:

$$Ep_i = V_W \cdot \frac{d}{V_D} = d \cdot \frac{V_W}{V_D} \qquad \text{Eq. (2)}$$

Wherein $V_W$ is the width of the viewing zone which is defined by a distance between $V_1$ and $V_K$.

Since $E_{pi}$ can be changed according to a shape or position of the sub viewing zone when the shape or position of the sub viewing zone is changed, the shape or position of the effective image display region 41 may also be changed. $E_{pi}$ may have a value from 0 to $pV_W/(V_W+p)$ based on the value of d. When $E_{pi}$ is greater than $P_i$, the image in one sub viewing zone may be overlapped in that of another sub viewing zone. Thus, to prevent the overlapping it must be satisfied that $E_{pi} P_i$. In order to minimize a difference 105 between $E_{pi}$ and $P_i$, it is necessary to maximize a difference d. The maximum distance of d is a distance between the point light source row 42 and the line 49 which is formed by connecting the intersections occurred when the two adjacent point light sources and $V_1$ and $V_K$ are connected. If the image row 43 is positioned at the line 49, the horizontal width $E_{pi}$ of the effective image display region 41 is equal to the horizontal width of the pixel cell 33. In this case, if the shape of the reference viewing zone is a rectangle or square, the effective image display region 41 becomes identical to the pixel cell 33. Thus, it is possible to display a high quality of image.

In Eq. (2), since $E_{pi}$ can not be greater than $P_i$, $E_{pi}$ may be less than the interval p of the point light sources. When p is constant, the greater the width $V_W$ of the reference viewing zone is, the shorter the distance d, which make $E_{pi}$ maximized, is. Therefore, the width $V_W$ of the reference viewing zone can be increased by disposing the image display mask 27 nearer the point light source array, thereby making a viewing angle to be broad. As the width $V_W$ of the reference viewing zone is increased, the width of the sub-viewing zone is also increased. If d is decreased, the illumination angle of the point light source must be wide enough to illuminate all the corresponding $E_{pi}$. If a distance $V_D$ between the reference viewing zone and the point light source array is increased along with $V_W$, $V_W$ may be increased but the viewing angle may not be changed. Since each of the sub viewing zones in the reference viewing zone is a small zone formed by collecting lights from the pixels corresponding to the identical view point of the pixel cells 33, typically the viewing zone is not continuous but divided into the sub viewing zones. If it is assumed that a distance 46 between the sub viewing zones $V_1$ and $V_2$ is V, a width $E_{pi}$ of an image corresponding to V in the effective image display region 41 may be obtained as:

$$\Delta Ep_i = \Delta V \cdot \frac{d}{V_D} \qquad \text{Eq. (3)}$$

As can be understood from Eq. (3), as V becomes greater, $E_{pi}$ becomes greater. Thus, the number K of the view point image to be displayed is limited; and, however, the dimension of each of the sub viewing zones in the reference viewing zone is increased depending on the dimension of $E_{pi}$. As V is increased, an area in the effective image display region 41 corresponding to the pixel of each of the view points is also increased. In contrast, if V is decreased, the area in the effective image display region 41 is also decreased in the shape of pin hole. Since V represents a dimension of the sub viewing zone, when $E_{pi}$ is increased, the dimension of the sub viewing zone is also increased while the number of multi-view images to be displayed is decreased.

Figure 5:
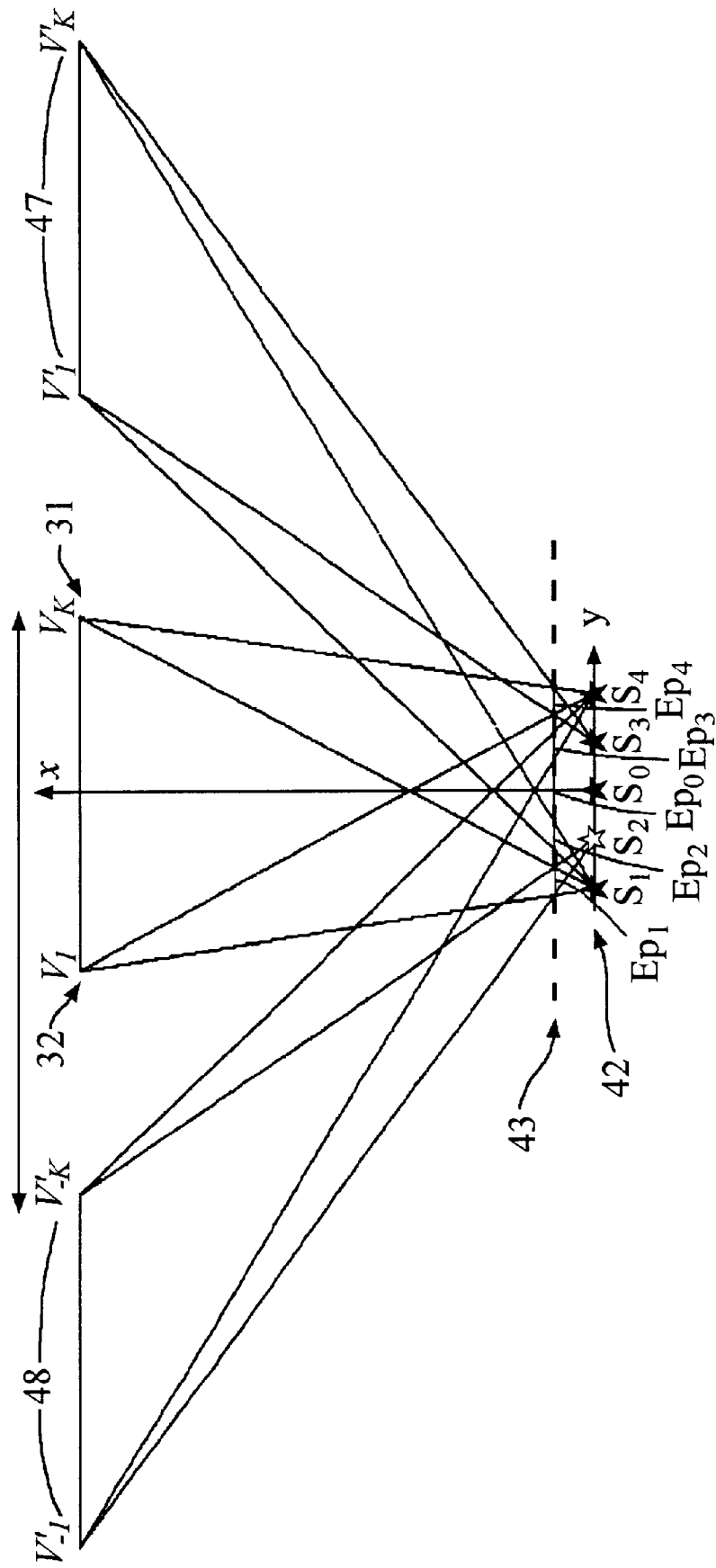
FIG. 5 illustrates a shape of the viewing zone to be formed by the image display mask given in FIG. 3.

FIG. 5 illustrates a shape of the viewing zone to be formed by the image display mask given in FIG. 3. The viewing zone from $V_1$ to $V_K$ defined in FIG. 4 is formed by each of the point light sources and the effective image display region corresponding thereto. Alternately, the viewing zone can be formed by the adjacent effective image display regions. As the difference d between the point light source row 42 and the image row 43 is increased, the possibility that the viewing zone may be formed by the adjacent effective image display regions is also increased. For example, in the case of the point light source $S_1$, the adjacent effective image display region exists in the right rather than the left thereof. In contrast, in the case of the point light source $S_4$, the adjacent effective image display region exists in the left rather than the right thereof. Thus, each of the point light sources and an effective image display region adjacent thereto, i.e. $S_1$ and $E_{p2}$, $S_2$ and $E_{p0}$, $S_0$ and $E_{p3}$, and $S_3$ and $E_{p4}$, may form a viewing zone 47. In addition, $S_4$ and $E_{p3}$, $S_3$ and $E_{p0}$, $S_0$ and $E_{p2}$, and $S_2$ and $E_{p1}$, may form a viewing zone 48. Further, each of the point light sources and an effective image display region adjacent to the image display region adjacent thereto, i.e. $S_1$ and $E_{p0}$, $S_2$ and $E_{p3}$, and $S_0$ and $E_{p4}$, may form another viewing zone in the right of the viewing zone 47. In addition, $S_4$ and $E_{p0}$, $S_3$ and $E_{p2}$, and $S_0$ and $E_{p1}$, may form still another viewing zone in the left of the viewing zone 48. Further, $S_1$ and $E_{p3}$ and $S_2$ and $E_{p4}$, may also form a viewing zone, and, $S_4$ and $E_{p2}$ and $S_3$ and $E_{p1}$, may also form a viewing zone. Also, $S_1$ and $E_{p4}$, and $S_4$ and $E_{p1}$, may form viewing zones, respectively. From such a relationship, it will be understood that, when there are five point light sources, there is one viewing zone where all of these five point light sources can be seen, there are two viewing zones where four point light sources can be seen, there are two viewing zones where three point light sources can be seen, there are two viewing zones where two point light sources can be seen, there are two viewing zones where one point light source can be seen. In other words, the relationship of $1+2(5-1)=9$ is obtained. Thus, if there are n point light sources and n pixel cells corresponding thereto in a horizontal direction, $1+2(n-1)=2n-1$ viewing zones may be formed in front of and parallel to the image row 43. However, as the viewing zone is apart from a center, the number of the point light sources to be seen is decreased by one. As a result, only one point light source can be seen in the most outer viewing zone. To solve this problem, it is designed to render the number of the pixel cells greater than that of the point light sources. A period of the viewing zone is given as $p_i V_D/d$ in a triangle $S_1 V_K V'_K$. When $E_{pi}=P_i$, a width of the viewing zone is maximized and the viewing zone may be appeared over the whole area of an image display screen. However, a pseudoscopic region may be occurred in a boundary between two viewing zones. The pseudoscopic region means the region that an image corresponding to a right eye is provided in a left eye and an image corresponding to the left eye is provided in the right eye so that an user may feel depths of the images inversely between right and left.

Figure 6:
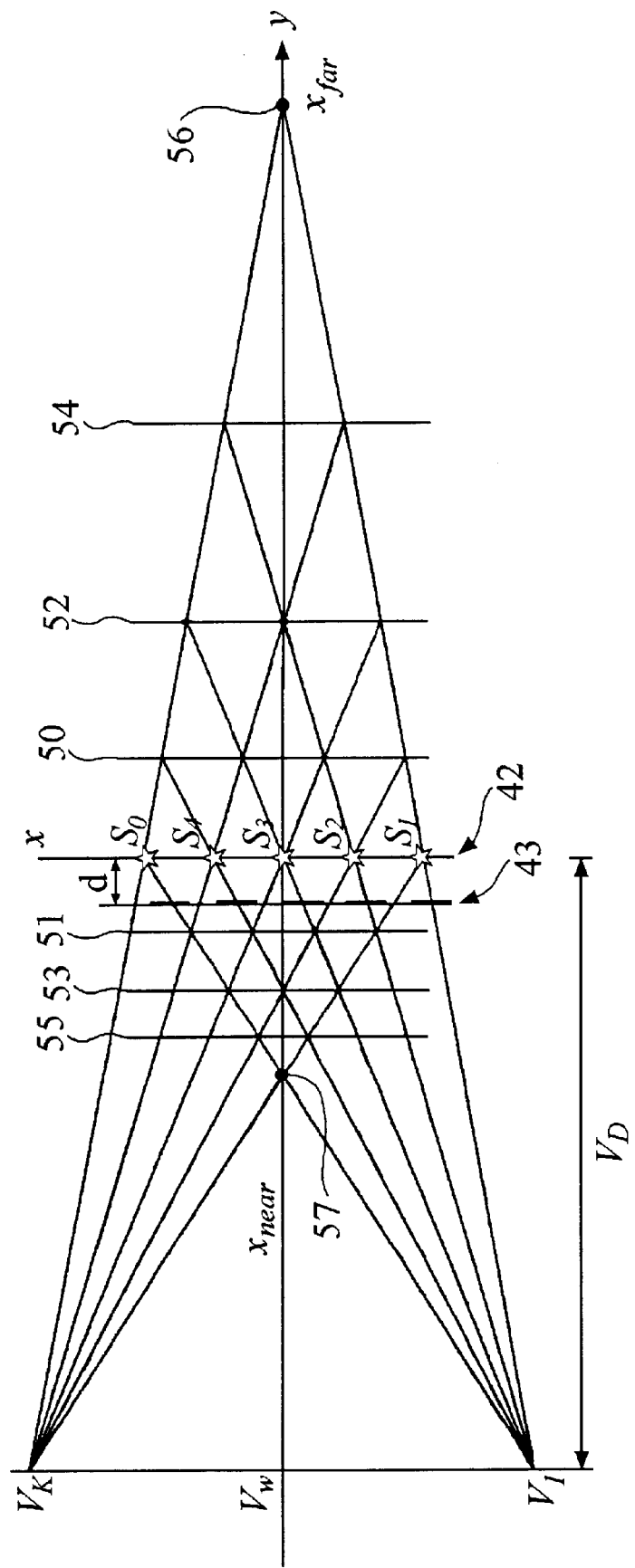
FIG. 6 illustrates a diagram for describing a depth of the multi-view image which may be obtained by the point light source array and the image display mask.

FIG. 6 illustrates a feel of depth of the multi-view image which may be obtained by the point light source array 24 and the image display mask 27. The user may feel the depth of the image by the portion where stereoscopic image lines are crossed. The stereoscopic image lines may be formed by connecting each of the point light sources and each of the sub viewing zones $V_1$ and $V_K$ in the left end 31 and the right end 32 of the reference viewing zone 28. In FIG. 6, there are stereoscopic image lines 50 and 51 which are formed by the two adjacent point light sources, stereoscopic image lines 52 and 53 which are formed by the two point light sources between which one point light source is inserted, and stereoscopic image lines 54 and 55 which are formed by the two point light sources between which two point light sources are inserted. Thus, as the number of the point light sources is increased, the feel of depth is also increased.

If it is assumed that there is the point light source row 42 formed by n point light sources and the position of the point light source row 42 is $x_0$, the relative position $x_{\pm j}$ (j=1, 2, 3, . . . , n−1) of each of the stereoscopic image lines is given as:

$$x \pm j = V_D \cdot \frac{\pm jp}{V_W \mp jp} \qquad \text{Eq. (4)}$$

In Eq. (4), a position 57 where the most protruded multi-view image may be appeared, i.e. a crossed position $x_{near}$ which exists nearest the viewer becomes $x_{-(n-1)}$ given as:

$$x_{near} = V_D \cdot \frac{-(n-1) \cdot p}{V_W + (n-1) \cdot p} \qquad \text{Eq. (5)}$$

In Eq. (4), a position 56 or $x_{far}$, where the image may be seen as if it is farthest in the image display screen, is theoretically infinite in the point light source row corresponding to an eye distance, i.e., $V_W$=jp; and, otherwise, $x_{far}$ is given as $x_{n-1}$.

Figure 7A:
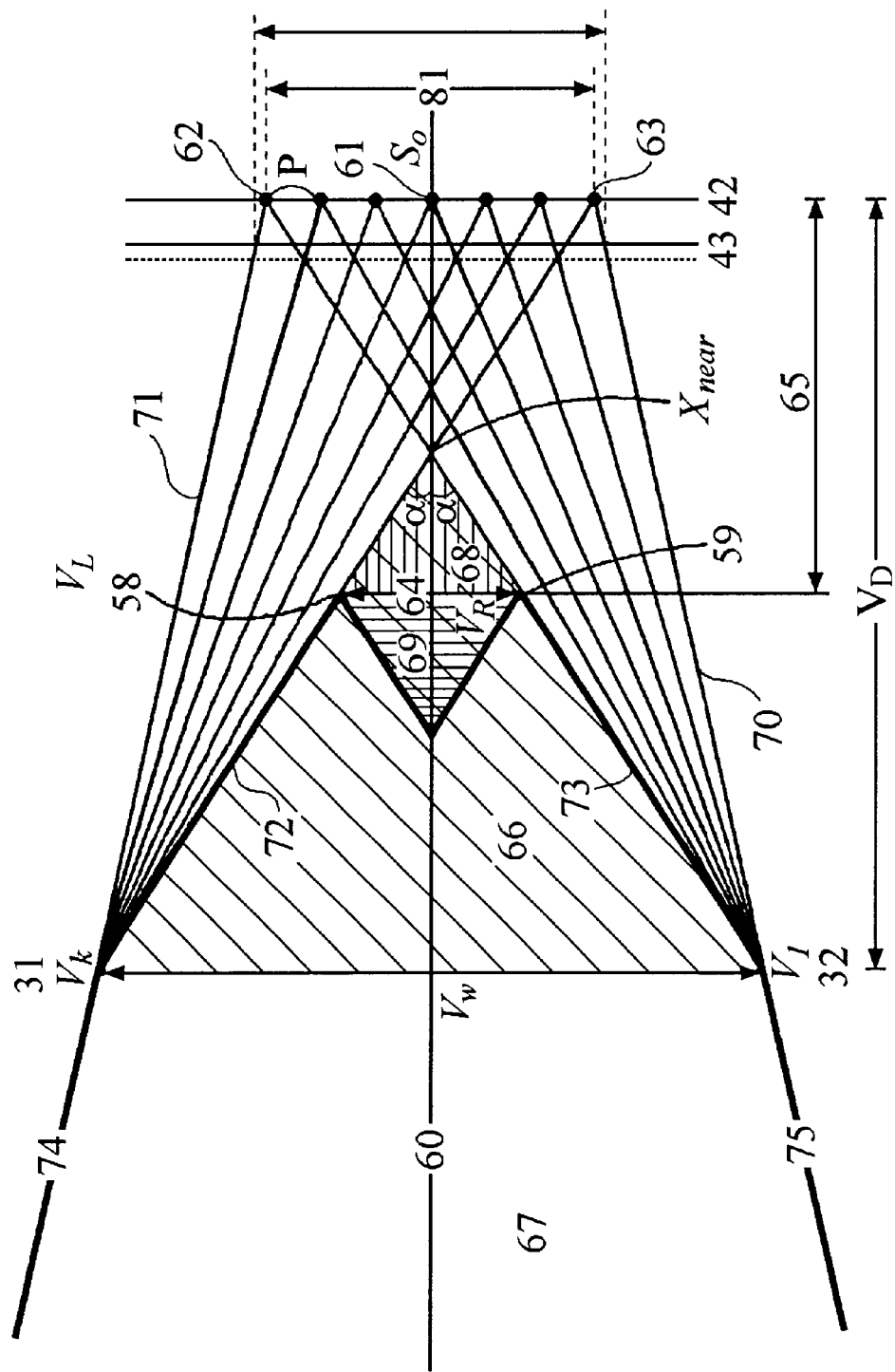
FIGS. 7A and 7B show the shape of the viewing zone which may be formed in the multi-view image display system by the point light source array and the image display mask.
Figure 7B:
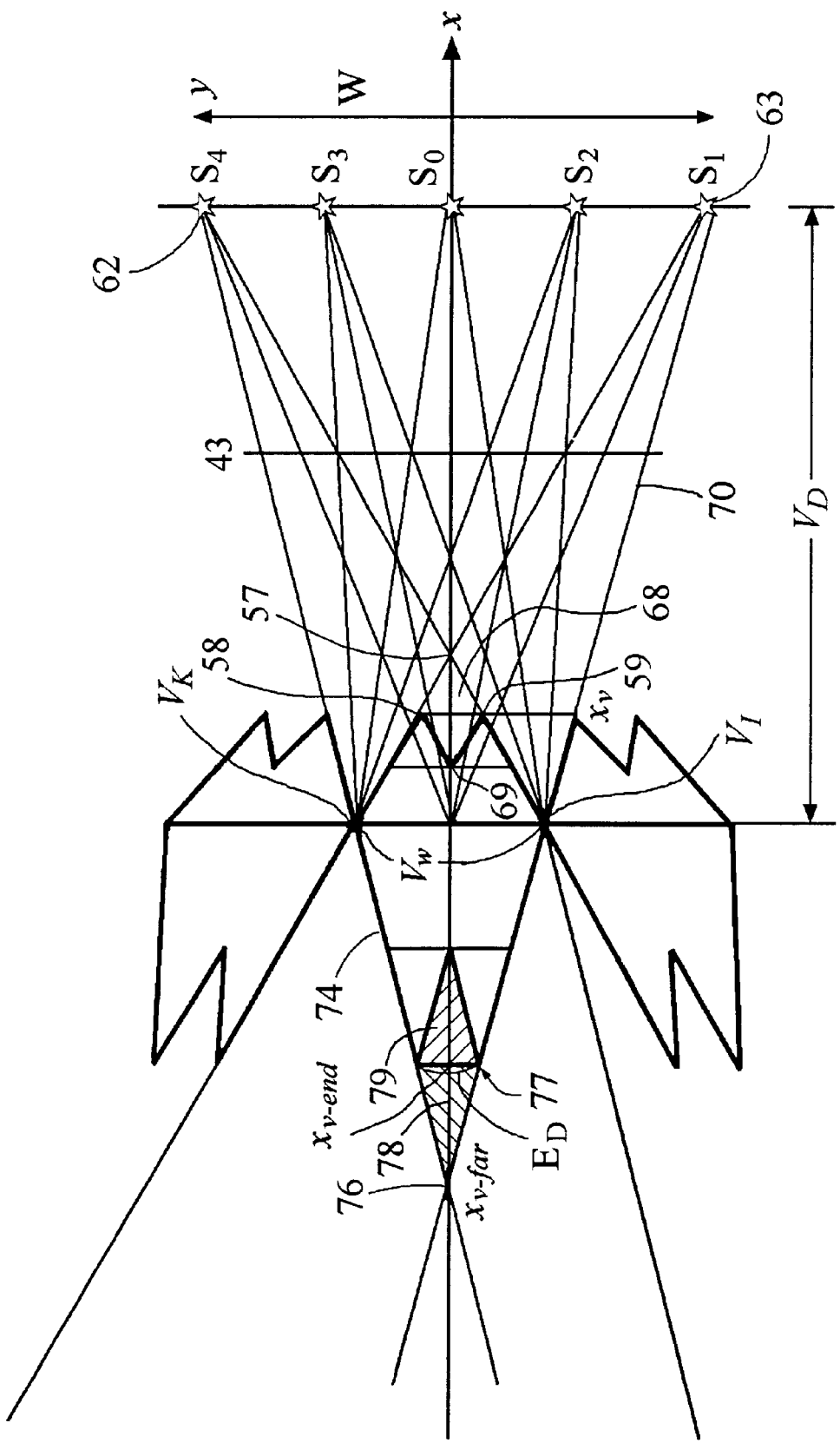

FIGS. 7A and 7B show shapes of the viewing zone which may be formed in the multi-view image display system by the point light source array and the image display mask. FIG. 7A shows that $V_W$ is not less than the width of the image display mask, and FIG. 7B shows that $V_W$ is less than the width of the image display mask. The least distance 65 or $x_v$ that a viewer can view may be defined as a distance between the point light source array and the position of a line 64 where the width of the viewing zone corresponds to the eye distance $E_D$. Specifically, $x_v$ may be obtained as follows. As defined in Eq. (5), $x_{near}$ is positioned at the portion where a center axis 60 of the system passing through the point light source 61 ($s_0$) at the center of the point light source row 42, a line 73 connecting the point light source 62 in the most left of the point light source row 42 and $V_1$, and a line 72 connecting the point light source 63 in the most right of the point light source row 42 and $V_K$ are crossed. If it is assumed that the width 81 of the point light source row 42 is W, and the angle defined by $x_{near}$ 57 and the center axis 60 in a triangle formed by $x_{near}$ 57 and the point light sources 62 and 63 is, $x_{near}$ may also be given as Eq. (6), wherein the width 81 indicates an interval between the point light sources in the top and the bottom of the point light source array, or an interval between the point light sources in the most left and the most right ends of the point light source array.

$$x_{near} = \frac{W}{2\tan\alpha} = V_D \cdot \frac{W}{W + V_W} \qquad \text{Eq. (6)}$$

The region, where the images having different view points can be seen separately and all the point light sources in the point light source row can be seen, includes a triangle region 66 formed by $x_{near}$ 57, $V_1$ and $V_K$, and a region 67 between the extended line 75 of the line 70 connecting the point light source 63 and $V_1$ and the extended line 74 of the line 71 connecting the point light source 62 and $V_K$. However, since $x_v$ may be given as Eq. (7), the region where the images having different view points can be seen in the viewer's two eyes may be started from $x_v$.

$$x_V = x_{near} + \frac{E_D}{2\tan\alpha} = V_D \frac{W + E_D}{W + V_W} \qquad \text{Eq. (7)}$$

Thus, this region 67 may be formed by extracting the area of a triangle 68 formed by view points 58, 59 and $x_{near}$ 57 and the area of triangle 69 symmetrical to the triangle 68 as to the line connecting the view points 58, 59 from the area of triangle $x_{near}V_1V_K$. As shown in FIG. 5, the viewing zones of the same shape as this viewing zone may be formed parallel and continuously in the left and the right of this viewing zone. In this example, the feel of depth may be almost infinite.

In the case that $V_W$ is less than the width of the image display mask as shown in FIG. 7B, $x_{near}$ 57 and $x_V$ are same as in FIG. 7A. However, since the line 70 connecting the point light source 63 and $V_1$ and the line 71 connecting the point light source 62 and $V_K$ may converge into a single point, the extended lines 75 and 74 may cross at a point 76 to render the dimension of the viewing zone finite. In consideration a distance between two eyes, the depth of the viewing zone is the greatest at the point 77 where the distance between the two lines 74 and 75 is equal to the eye distance $E_D$. The viewing zone may consist of the area which is formed by extracting the area of a triangle 68 by view points 58, 59 and $x_{near}$ 57 and the area of triangle 69 symmetrical to the triangle 68 with respect to the line connecting the view points 58 and 59 from the area of triangle $x_{near}V_1V_K$, and the area which is formed by extracting the area of triangle 78 by the point 76 and the line connecting the lines 74 and 75 and the area of triangle 79 symmetrical to the triangle 78 with respect to the line connecting the lines 74 and 75 from the area of triangle by the crossed point 76, $V_1$ and $V_K$. Further, other viewing zones having similar shape to the viewing zone may be formed in the left and right of the viewing zone with sharing $V_1$ and $V_K$. Also, these other viewing zones are parallel to and adjacent to the viewing zone. The viewing zone and the other viewing zones constitute a large or desired viewing zone.

If it is assumed that the distances from the point light source row 42 to each of the crossed point 76 and the point 77 are $x_{V\text{-}far}$ and $x_{V\text{-}end}$, $X_{V\text{-}far}$ and $X_{V\text{-}end}$ are as follows:

$$x_{V-far} = V_D \cdot \frac{W}{W - V_W} \qquad \text{Eq. (8)}$$

$$x_{V-end} = V_D \frac{W - E_D}{W - V_W} \qquad \text{Eq. (9)}$$

From Eqs. (8) and (9), the depth of the viewing zone, $x_{V\text{-}end}$-$x_V$, can be represented as:

$$x_{V-end} - x_V = 2V_D W \frac{V_W - E_D}{(W - V_W) \cdot (W + V_W)} \qquad \text{Eq. (10)}$$

As can be seen from Eq. (10), the depth of the viewing zone is increased if at least one of $V_D$ and $V_W$ is increased.

Figure 8:
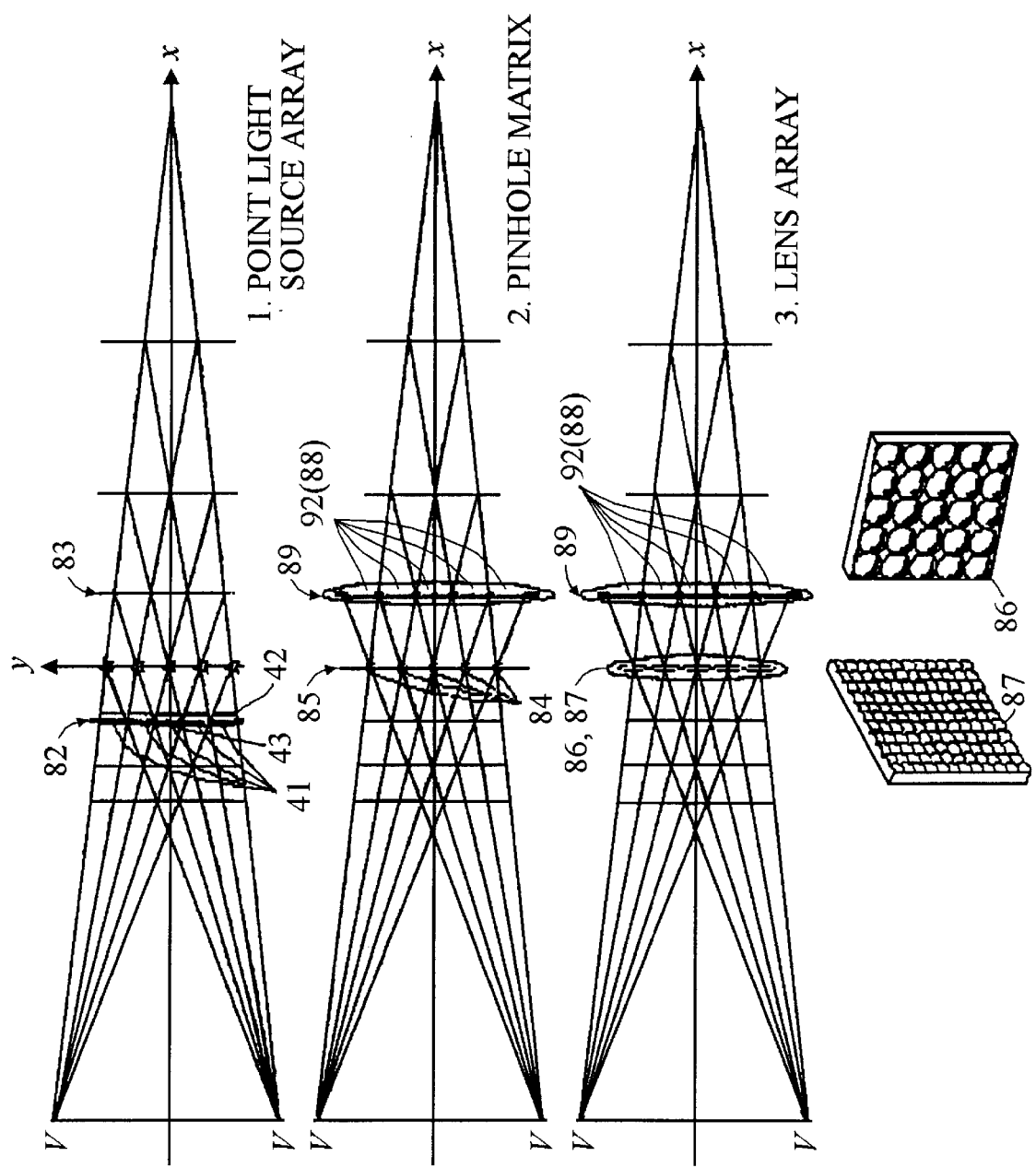
FIG. 8 illustrates a diagram for explaining another the multi-view 3-D image display method according to another embodiment of the present invention, using the point light source array and the image display mask as shown in FIGS. 2, 7A and 7B.

FIG. 8 illustrates other embodiments of the multi-view 3-D image display method using the point light source array and the image display mask as shown in FIGS. 2, 7A and 7B. A LED array, a LD (Laser Diode), or a focusing light source array using a micro lens array like IP plate can be used as the point light source array in the multi-view image display method using the point light source array and the image display mask. However, since an ideal point light source may be needed to obtain the image of high sharpness, it is difficult to display a full color image by the LED or the LD array of the three primary colors. Further, the focusing light source array may occur interference between the pixel cells; and, therefore, it is difficult to realize a sharp image. Also, the realized image is comprised of a group of light points by the point light source, thus the quality of the realized image is very deteriorated. One of the methods which can overcome these problems is to exchange the positions of the point light source array and the image display mask and to use a pin hole array, an IP plate, a four-faced lens array or a cross lenticular array which is made by two lenticular surfaces of two lenticular plates having an identical width and a focusing distance faced each other and crossed vertically instead of the point light source array. If it is assumed that the image display mask 27 is at the position $x_{-1}$ 82 in FIGS. 6, 7A and 7B, the effective image display region becomes the pixel cell itself. When the image display mask 27 at the position $x_{-1}$ 82 in FIG. 5 is moved at the position $x_1$ 83, the positions of the pixels in each of the effective image display regions 41 must be exchanged (i.e., the positions of the pixels which are symmetrical against the center-crossed line of the effective image display are exchanged) and expanded. In this case, it is possible to use the pin hole array 85 having a pin hole 84 at the position of the point light source instead of the point light source array. Also, it is possible to use an IP plate 86 or a four-faced lens array 87 instead of the pin hole array 85, wherein a micro lens or four-faced lens is arranged, the center of each of the lens is consistent with that of the point light source, the width of each of the lens being same as that of the point light source, and the focusing distance is equal or a little shorter than $pV_D/(V_W-p)$. The width $p_i$ of the pixel cell 92 in the image display mask 89 at the position of $x_1$ 83 may be given as:

$$p_i = \frac{pV_W}{V_W - p} \quad \text{Eq. (11)}$$

In Eq. (11), $p_i$ is extended by m times than the effective image display region 42 at the position 82 of $x_{-1}$, where m is given as:

$$m = \frac{V_W + p}{V_W - p} \quad \text{Eq. (12)}$$

As given in Eq. (11), since the width of the pixel cell 92 of the image display mask 89 is greater than the period of the point light sources p, i.e., the width of the pin hole, the micro lens or the four-faced lens, these can not cover the pixel cell completely. In addition, the center of the pin hole, the micro lens or the four-faced lens is not consistent with that of the effective image display region in the pixel cell.

In FIGS. 6, 7A and 7B, the position of the image display mask 27 may be changed over the range of 0 to $pV_D/(V_W+p)$, i.e., from the point light source array to the position 82 of $x_{-1}$. While, in FIG. 8, the position of the image display mask 89 may be changed over the range of 0 to $pV_D/(V_W-p)$, in other words, from the pin hole, the micro lens or the four-faced lens to the position 83 of $x_1$. Thus, the focusing distance of the micro lens array 86 or the four-faced lens array 87 can be selected in the range of 0 to $pV_D/(V_W-p)$ according to the position of the image display mask 89. In the range over where the image display mask 89 may be positioned, since the dimension of the pixel cell is greater than the width of the pin hole, the micro lens or the four-faced lens, the effective image display region at the center of each of the pixel cells is disposed at the outer position compared to the center of a corresponding pin hole, the micro lens or the four-faced lens. This deviation degree of the center is increased when the pixel cell is furthest from the center of the image display mask.

FIG. 9 illustrates the relative dimension and position of the effective image display region of the image display mask and the micro lens array shown in FIG. 8. The image display mask 89 is comprised of 5×5 pixel cell 92 corresponding to 5×5 multi-view image array, the effective image display region 88 of each of the pixel cells 92 is comprised of 5×5 pixel corresponding to the multi-view image array, and the dimension of the effective image display region 88 is equal to that of the pixel cell 92. A 5×5 micro lens array 86 is disposed on the image display mask 89 with keeping the focusing distance f to be equal to or near to $pV_D/(V_W-p)$. In the 5×5 micro lens array 86, a plurality of micro lens having an identical width and an identical focusing distance are disposed adjacent to one another in two-dimensional, with keeping the micro lens 91 having the width of p to place in the center 90 of the center pixel cell 93 of the image display mask 89. Since the dimension of each of the micro lens is less than the width of the corresponding pixel cell 92, the deviation degree of the position between the micro lens and the corresponding pixel cell is largest when the pixel cell is furthest from the center of the image display mask.

Since a gap is occurred between the micro lens in the micro lens array 86, the pixel in the effective image display region can be seen directly; and, as a result, some disadvantages may be occurred. Therefore, it is preferable to use the four-faced lens array where the gap is not occurred between the micro lens. In this case, because it is difficult to fabricate the four-faced lens array 87, it is preferable to use a cross lenticular array 95 which is formed by facing the surfaces of two lenticular plates having equal widths and equal focusing distances and crossing them vertically. When the surfaces of the two lenticular plates are faced and adhered each other, if the thickness of the lower lenticular plate 96 is equal to the focusing distance thereof, the focusing distance of the upper lenticular plate 97 may be equal to that of the lower lenticular plate 96 with respect to the image display mask 89 positioned on the surface 99 of the substrate of the lower lenticular plate 96.

Alternatively, in the case that the lenticular array, the micro lens array or the pin hole array is used, the image display mask may be illuminated by an external diffuse light or by a diffused light from a backlight lamp with a diffusing screen so that the brightness of the image is increased. Also, a diffuser may be attached in front of the IP plate, the quadrangle lens array or the crossed lenticular array so as to increase the uniformity of the image according to to the resolution of the image display mask.

Figure 10A:
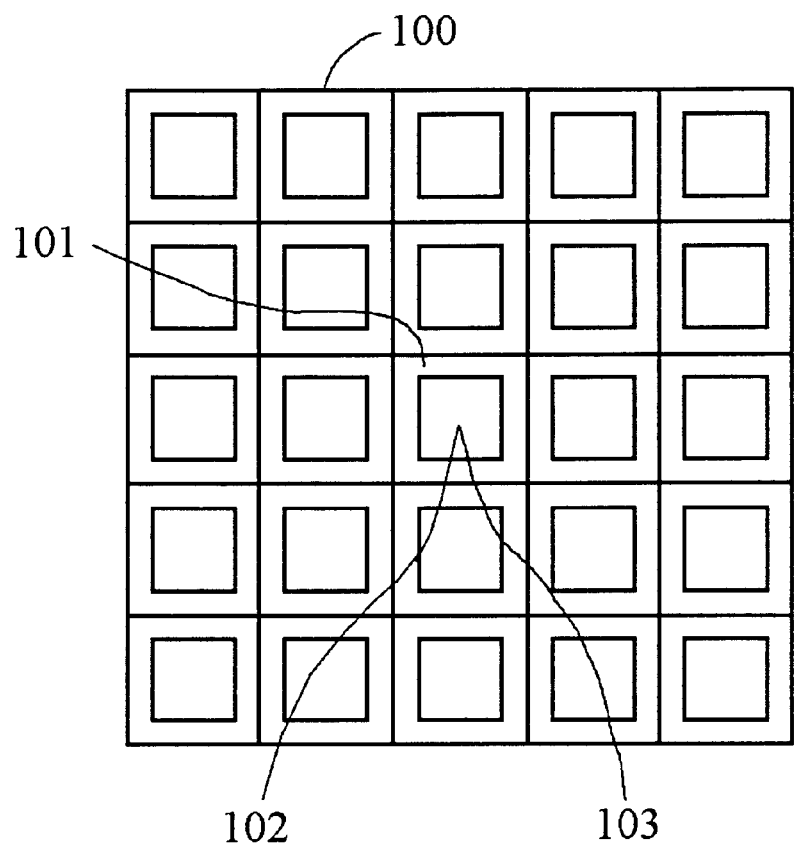
FIGS. 10A and 10B illustrate the method capable of adjusting a parallax direction according to an array of the pixels in the effective image display region.
Figure 10B:
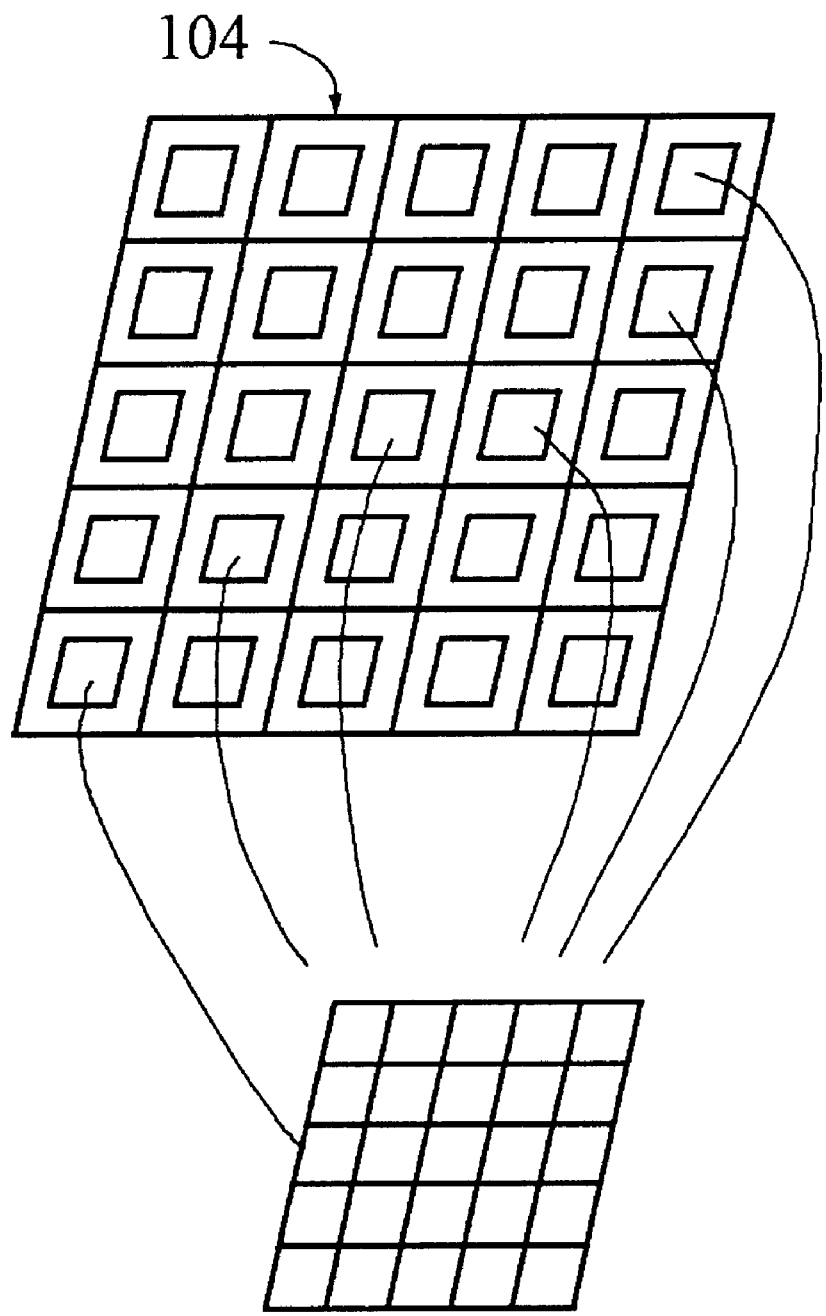

FIGS. 10A and 10B illustrate the method capable of adjusting a parallax direction according to an array of the pixels in the effective image display region. For example, if it is intended to fabricate a square image display mask 100 having only one of a horizontal parallax and a vertical parallax, the same pixels may be displaced in the vertical direction or the horizontal direction in the effective image display region.

In FIG. 10A, a pixel array 102 has only the horizontal parallax in the effective image display region of the image display mask 100 formed of 5×5 pixel cells, and the same pixels are arranged continuously in the vertical direction in the pixel array 102. In contrast, a pixel array 103 has only the vertical parallax in the effective image display region, and the same pixels are arranged continuously in the horizontal direction. For example, in the case of the center pixel cell 101 in the image display mask 100, to provide only the horizontal parallax, only thirteenth pixels within the first to the fifth multi-view images 1–5 for each of the columns of the effective image display region are displayed. On the other hand, to provide only the vertical parallax, only thirteenth pixels in the first to the fifth multi-view images 1–5 for each of the rows of the effective image display region are displayed.

As shown in FIG. 10B, when the image display mask is in the shape of the rhombus similar to a rectangle or square, each of the pixel cells may be in the shape of the rhombus and the effective image display region of each of the pixel cells may be in the shape of the rhombus, thereby inclining the pixel array. Thus, it is possible to provide the parallax of the desired direction by using the inclined lenticular plate.

Figure 11A:
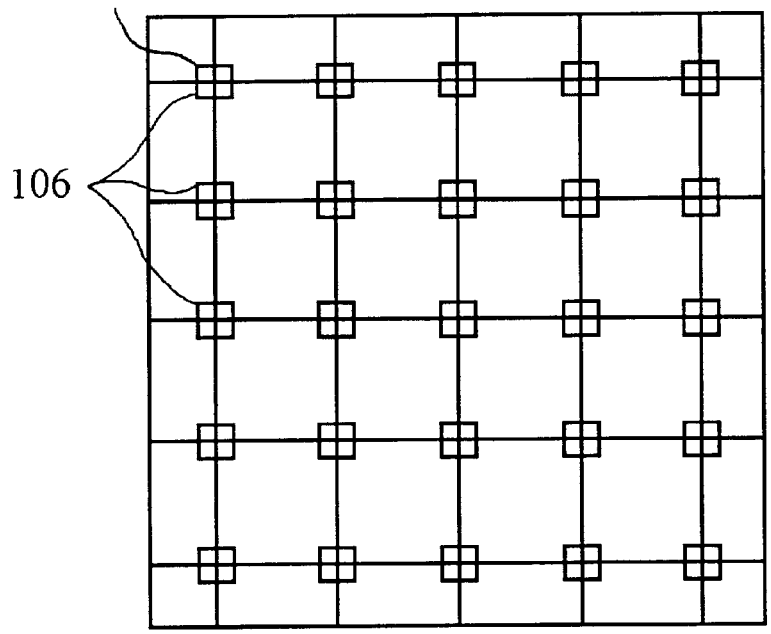
FIGS. 11A and 11B illustrate the shape of the two-dimensional pin hole array shown in FIG. 8.
Figure 11B:
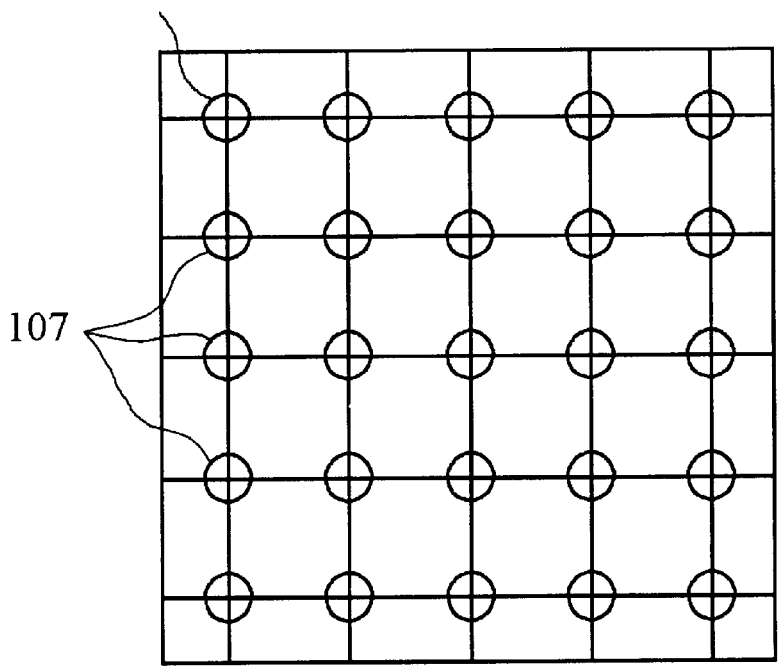

FIGS. 11A and 11B illustrate the shape of the two-dimensional pin hole array shown in FIG. 8. In these figures, the pin hole array 85 is formed by substituting the minute openings in the shape of a square 106, a circle 107, or a rectangle for the point light source in the point light source array shown in FIG. 4.

According to this invention, it is possible to provide the horizontal parallax, the vertical parallax or the horizontal-vertical parallax by using any one of the point light source, the IP plate, the lenticular plate, the cross lenticular plate and the four-faced lens plate along with the multi-view image display mask.

In addition, special patterns may be recorded in the horizontal or the vertical directions of the image display mask so that embedded or changed images are generated. Further, a narrow line may be added in the image display mask so that the image display mask can be aligned to IP plate, the quadrangle lens array or the crossed lenticular array. The lines are supposed to be parallel to the axes of IP plate, the quadrangle lens array or the crossed lenticular array. For example, with using the long lines included near the mask side, it is possible to align the image display mask by the angle relative to the IP plate, the quadrangle lens array or the crossed lenticular array by testing the visibility of the lines until Moire patterns disappear from the visible line image. Moire patterns appear when the axes of the mask and the IP plate, the quadrangle lens array, the crossed lenticular array don't match each other. Additionally, the image display mask can be aligned in consideration of displacement relative to the IP plate or the quadrangle lens array or the crossed lenticular array by testing the visibility of the lines until the image of the lines appear in a predetermined region of the viewing zone, in the case the short lines are included in a few (one or two) source view images.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A multi-view image display system for providing a plurality of view images having different view points to a viewer, the plurality of view images forming individual viewing zones, respectively, and the viewing zones being arranged two-dimensionally to form a reference viewing zone, the system comprising:

a point light source array having M×N point light sources; and an image display mask disposed between the reference viewing zone and the point light source array, wherein the image display mask has M×N pixel cells, each of the pixel cells being illuminated by each of the point light sources, wherein each pixel cell has an image display region which is divided into a plurality of subcells arranged depending on an arrangement structure of the viewing zones, wherein each of the subcells transmits or reflects lights from the point light sources using a whole area of each subcell, thereby allowing the transmitted or reflected lights to be collected in each of the viewing zones to form each of the view images, and wherein a horizontal width of a pixel cell is determined based on a position of the image display mask and a first triangle including one of most outer viewing zones and two adjacent point light sources.

2. The system of claim 1, wherein the position of the image display mask is controlled such that a size of the image display region is less than or equal to that of a corresponding pixel cell of the image display region.

3. The system of claim 1, wherein the image display region is positioned at a center of the corresponding pixel cell.

4. The system of claim 1, wherein the horizontal width of the pixel cell is equal to a distance between two intersection points where the position of the image display mask and the first triangle cross.

5. The system of claim 1, wherein a horizontal width of the image display region is determined based on a position at which the image display mask is disposed and a second triangle including two most outer viewing zones and a point light source corresponding to the image display region.

6. The system of claim 5, wherein the horizontal width of the image display region is equal to a distance between two intersections where the position of the image display mask and the second triangle cross.

7. The system of claim 1, wherein a shape of the image display region is similar to that of a viewing zone.

8. The system of claim 1, wherein pixels located at identical positions on the view images are arranged in the image display region by taking account of relative positions of the view images, respectively.

9. The system of claim 1, wherein a shape of each of the subcells is equal to that of a corresponding image display region.

10. The system of claim 1, wherein the image display regions have an identical shape and an identical size.

11. The system of claim 1, wherein the image display mask is disposed between the point light source array and an intersection point where two lines connecting two adjacent point light sources and most left and most right ones of the viewing zones cross.

12. The system of claim 1, wherein pixels of continuous view images are displayed in a region except the image display region in the pixel cell.

13. The system of claim 1, wherein a size of each of the viewing zones is proportional to that of a corresponding pixel within the image display region.

14. The system of claim 8, wherein pixels existing within the image display region are disposed in one of a one-dimensional and a two-dimensional fashions.

15. The system of claim 1, wherein a part of each subcell has a shape form of one of square and rectangle.

16. The system of claim 1, wherein sizes and shapes of pixels, which are corresponding to an identical view point within the image display regions, are equal to each other.

17. The system of claim 5, wherein the point light source array is replaced with one of a pin hole array, an integral photography (IP) plate and a quadrangle lens array where pin holes, and a focal point of a circular micro lens and a quadrangle micro lens are disposed at positions of corresponding point light sources, and a cross lenticular array which is formed by vertically crossing two lenticular plates having an identical period and an identical focus distance while rendering surfaces of the two lenticular plates to be faced with each other.

18. The system of claim 17, wherein positions of the pixels in the image display region are exchanged symmetrically with respect to a central point of the image display region.

19. The system of claim 17, wherein focus distances of the integral photography plate, the quadrangle lens array and the cross lenticular array are equal to or less than a distance between the point light source array and the image display mask.

20. The system of claim 17, wherein widths of the pixel cells are greater than those of pin holes in the pin hole array, and those of a lens in the integral photography plate and the cross lenticular plate.

21. The system of claim 17, wherein a displacement between a center of the pin hole or the lens and a center of the image display region corresponding to the pin hole or the lens increases as the pixel cell is farther from a center of the image display mask.

22. The system of claim 17, wherein shapes of the reference viewing zone, the image display mask, the image display region and the arrangement of the pixels are rhombus, and an inclined lenticular plate corresponding to the rhombus is used.

23. The system of claim 1, wherein a same pixel of a same view point is repeatedly displayed in a horizontal or a vertical direction of the image display region to provide one of a horizontal parallax and a vertical parallax.

24. The system of claim 17, wherein a width of lenticulars in the lenticular plate in a vertical direction and a horizontal direction and a diameter of two circular micro lenses are equal to periods of the point light sources in the point light source array.

25. The system of claim 17, wherein the pin holes are in the form of one of circle, square and rectangle.

26. The system of claim 17, wherein a distance between the image display mask and the pin hole array, a focal point of the integral photography plate, the quadrangle lens array, or the cross lenticular array is given as $$\frac{pV_D}{(V_W - p)},$$

and a size $p_i$ of the pixel cell is given as $$\frac{pV_w}{(V_w - p)},$$

where p is a period of the pin hole, the circular micro lens or the quadrangle micro lens, $V_w$ is a horizontal and a vertical width of the viewing zone, and $V_D$ is a distance between the image display mask and the viewing zone.

27. The system of claim 1, wherein the point light sources are provided by an external diffuse light.

28. The system of claim 1, wherein the point light sources are provided by a backlight lamp with a diffusing screen.

29. The system of claim 1, wherein the image display mask is displayed on a light-emitting display screen.

30. The system of claim 17, wherein a linear diffuser is attached in front of the IP plate, the quadrangle lens array, or the cross lenticular array.

31. The system of claim 1, wherein a layout of the pixel cell is random.

32. The system of claim 1, wherein a multi-view image of a same object is observed within the viewing zone.

33. The system of claim 1, wherein different multi-view images of different objects are observed within each of predetermined regions in the viewing zone.

34. The system of claim 1, wherein the image display mask is generated by a computer supporting layout for the pixel cell and the subcell based on the plurality of view images.

35. The system of claim 1, wherein a pitch of the pixel cell of the image display mask is not equal to an integer number multiplied by a pitch of the pixel of devices configured to display or print the image display mask.

36. The system of claim 17, wherein at least two long narrow lines are added to sides of the image display mask so as to be parallel to axes of the IP plate, the quadrangle lens array or the cross lenticular array, and wherein the image display mask is aligned in consideration of an angle relative to the IP plate, the quadrangle lens array or the cross lenticular array by testing a visibility of the lines until Moire patterns disappear from the lines.

37. The system of claim 17, wherein at least two short narrow lines are added to the image display mask so as to be parallel to the axes of the IP plate, the quadrangle lens array or the cross lenticular array, and wherein the image display mask is aligned in consideration of displacement relative to the IP plate or the quadrangle lens array or the cross lenticular array by testing the visibility of the lines until an image of the lines appears in a predetermined region of the viewing zone.

* * * * *